Aug. 30, 1966   G. H. A. FENTON   3,269,312
AERIAL VEHICLES
Filed July 3, 1963
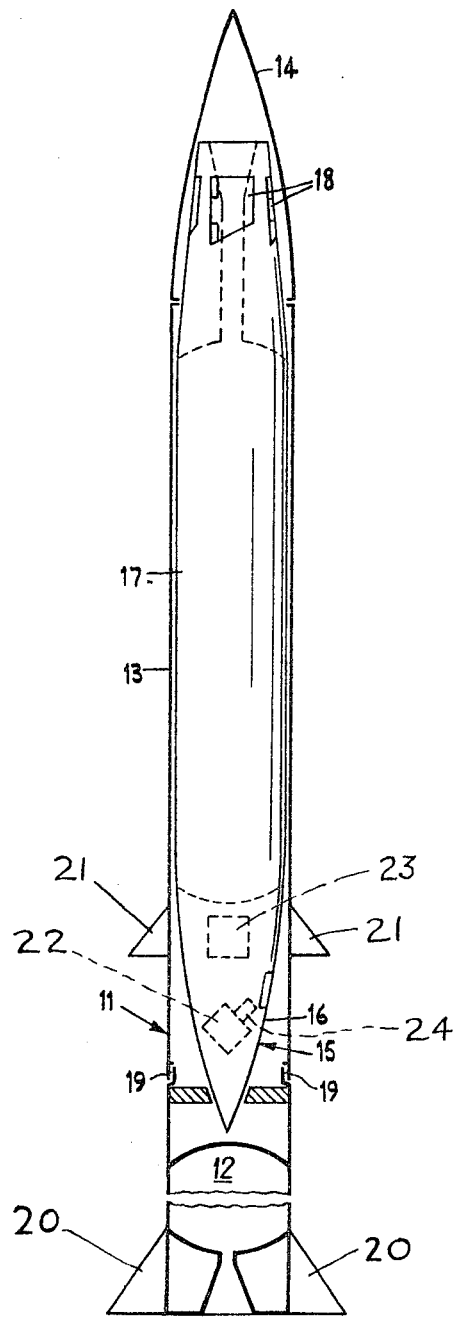
Inventor
George Herbert Alexander Fenton
By
Stevens, Davis, Miller & Mosher
Attorneys

United States Patent Office 3,269,312
Patented August 30, 1966

3,269,312
AERIAL VEHICLES
George Herbert Alexander Fenton, Harpenden, England, assignor to British Aircraft Corporation (Operating) Limited, a British company
Filed July 3, 1963, Ser. No. 293,575
Claims priority, application Great Britain, July 10, 1962, 26,576/62
5 Claims. (Cl. 102—49)

This invention relates to aerial vehicles.

According to this invention, an aerial vehicle has a hollow forward portion containing a second aerial vehicle which is disposed with its nose pointing towards the rear of the first vehicle, the first vehicle being arranged to be separable into at least two parts to allow the second vehicle to be launched from the forward portion of the first vehicle.

Examples of aerial vehicles according to this invention will now be described with reference to the accompanying drawing.

Referring to the drawing, a first missile 11 comprises a rear portion containing a rocket motor 12, and a forward portion 13 which is of hollow tubular form and has a nose 14 of substantially conical shape at its front end. The rear portion of the first missile has a set of stabilising fins 20 and the forward portion has a set of fins 21. The missile is intended to be launched with a spin about its axis, and the fins are appropriately offset for that purpose. Within the tubular portion 13 of this first missile there is a second missile 15, the nose of which faces towards the tail of the first missile.

The forward portion 16 of the second missile contains, for example, a reconnaissance camera 22, and a device 23 for evaluating missile attitude or position, which is used when a pre-determined value is reached to fire the motor of the second missile. Its central and rear portion comprise a rocket motor 17 and retractable stabilising fins 18.

The first missile 11 is provided with a separation joint 19, at the aft end of the tubular portion 13. The joint 19 has a small explosive charge fixed electrically to cause separation.

In operation, the first missile 11 is launched on a desired trajectory. The rocket motor 12 burns only for a few seconds and it is then separated by firing the small explosive charge at the joint 19. The forward portion of the missile then continues under the control of its fins 21. At the desired point in the trajectory, when the missile is descending, the camera is caused to start operating by the device 23, and a gyro-controlled device in the nose of the second missile (not shown) detects the vertical and operates the camera each time the lens 24 is pointing downwards in a vertical plane. Thus a photograph is made once during each revolution of the missile about its axis. When a pre-determined position along the missile trajectory is reached, the motor 17 of the second missile 15 is fired by the device 23 which measures the missile attitude or position. The efflux of the motor 17 shatters the nose 14 of the first missile 11, and the retractable stabilising fins 18 of the second missile are pivoted to extend when the missiles separate. The second missile, which contains the reconnaissance camera, then returns under the power of its own motor to the region of the point from which the combined missiles were launched.

In the example shown in the drawing, the part of the wall of the second missile directly in front of the camera lens 24 must include a window, and so too must the wall of the first missile. The second window may alternatively be avoided by placing the separation joint 19 immediately behind the fins 21.

The device 23 which starts off the camera and fires the rocket motor of the second missile is preferably controlled by a gyro which is sensitive to the angle of inclination of the missile to the horizontal. The gyro may also cause a parachute to open when the second missile has returned to the area at which the combined missile was originally launched. As an alternative to a gyro, the device 23 may have a barometric device sensitive to altitude, or simply a clock determining the various operations in a timed sequence.

The range of the missile may be 10–20 kilometres. A reconnaissance camera may be required to operate at a height of about 100 feet, at which height the forward portion of the first missile would be at a steeply descending part of its trajectory. For example, the angle of the axis to the horizontal may be 52°–56°. The maximum height of the combined missile may be about 7000 to 10,000 feet, with an initial launching inclination of 20°–28°. On the other hand the second missile, being launched at inclination of about 52°–56°, will follow a higher trajectory with a maximum height of 25,000–50,000 feet.

Unless provision is made to slow down the combined missile before the second missile is launched, the launching acceleration of the second missile should be as high as possible, for example up to 100 g to avoid instability during launching; for that purpose the second missile may have a boost which gives a brief period of high acceleration during launching. The combined missile may, if desired, be slowed down by drag brakes or by a parachute before the second missile is launched.

Separation of the motor from the first missile may be achieved by means other than an explosive charge at the joint 19. For example the motor may be of larger diameter than the remainder so that it experiences drag which separates it from the remainder after it has burnt out, or it may have drag brakes; drag brakes could serve the additional purpose of controlling the range of the missile. Alternatively the motor itself could provide an explosive force through forwardly facing ports, and this could also be used for range control.

I claim:

1. An aerial reconnaissance vehicle comprising a first cylindrical rocket missile having a rear portion including a propulsion means at its rear end, said propulsion means lying within the circular periphery of the missile, and a hollow front portion containing a second rocket missile which is disposed with its nose pointing towards the rear end of the first missile and which has a propulsion nozzle at its rear end; means for separating the rear part of the first missile from the front part containing the second missile; fin means on the rear portion of the first missile for stabilizing the first missile in a spinning condition; further fin means on the front portion of the first missile for stabilizing the said front portion in a spinning condition after separation of the said rear portion from the said front portion; a camera mounted in the front of the second missile with its lens pointing laterally and somewhat towards the front end of the first missile; window means in front of the camera, and gyro-operated means for operating the camera each time the camera lens points downwards during the descent of the combined first and second missiles.

2. An aerial reconnaissance vehicle comprising a first rocket missile having a rear portion including a single propulsion nozzle at its rear end, which nozzle is coaxial with, and is not of greater lateral dimensions than, the missile, and a hollow front portion containing a second rocket missile which has a form corresponding to, and of only slightly smaller magnitude than, the internal form of the first missile, and which is disposed with its nose pointing towards the rear end of the first missile and which has a propulsion nozzle at its rear end; means for separating the rear part of the first missile from the front part containing the second missile; means for spinning the combined first and second missiles about their longitudinal axis; a camera mounted in the front of the second missile with its lens pointing laterally and somewhat towards the front end of the first missile; window means in front of the camera; and gyro-operated means for operating the camera each time the camera lens points downwards during the descent of the combined first and second missiles.

3. An aerial reconnaissance vehicle comprising a first cylindrical rocket missile having a rear portion including a propulsion means at its rear end, said propulsion means lying within the circular periphery of the missile, and a hollow front portion containing a second rocket missile which is disposed with its nose pointing towards the rear end of the first missile and which has a propulsion nozzle at its rear end; means for separating the rear part of the first missile from the front part containing the second missile; fin means on the rear portion of the first missile for stabilizing the first missile in a spinning condition; further fin means on the front portion of the first missile for stabilzing the said front portion in a spinning condition after separation of the said rear portion from the said front portion; further stabilizing fin means on the second missile, which are pivoted to lie flush with the surface thereof when said second missile is positioned within said first missile, and which will extend substantially radially outwards when said missiles are separated; a camera mounted in the front of the second missile with its lens pointing laterally and somewhat towards the front end of the first missile; window means in front of the camera, and gyro-operated means for operating the camera each time the camera lens points downwards during the descent of the combined first and second missiles.

4. An aerial reconnaissance vehicle comprising a first rocket missile having a rear portion including a single propulsion nozzle at its rear end which nozzle is coaxial with, and is not of greater lateral dimensions than, the missile, and a hollow front portion containing a second rocket missile which has a form corresponding to, and of only slightly smaller magnitude than, the internal form of the first missile, and which is disposed with its nose pointed towards the rear end of the first missile and which has a propulsion nozzle at its rear end; means for separating the rear part of the first missile from the front part containing the second missile; means for spinning the combined first and second missiles about their longitudinal axis; a camera mounted in the front of the second missile with its lens pointed laterally and somewhat towards the front end of the first missile; window means in front of the camera; the forward portion of the second missile further containing an inclination responsive gyro-controlled device which firstly starts the camera operating when a predetermined value of inclination is attained, and secondly fires the motors of the second missile at another predetermined value of inclination.

5. An aerial reconnaissance vehicle comprising a first rocket missile having a cylindrical casing including a rear portion containing within it a propulsion nozzle, and including a hollow front portion containing a second rocket missile having a cylindrical outer casing of external diameter only slightly smaller than the internal diameter of the cylindrical casing of the first rocket missile, the said second missile having its nose portion adjacent to the rear end of the first missile and having a propulsion nozzle situated centrally within its rear end; means for separating the rear part of the first missile from the front part containing the second missile, leaving a full-diameter opening at the rear end of the front part of the first missile for the passage of the second missile; means for spinning the combined first and second missiles about their longitudinal axis; a camera mounted in the nose portion of the second missile with its lens pointing laterally and somewhat towards the front end of the first missile; window means in front of the camera lens, and gyro-operated means for operating the camera each time the camera lens points downwards during the descent of the combined first and second missiles.

References Cited by the Examiner

UNITED STATES PATENTS

| | | | |
|---|---|---|---|
| 1,880,960 | 10/1932 | Keale | 95—12.5 |
| 2,145,508 | 1/1939 | Denoix | 102—51 |
| 2,763,447 | 9/1956 | Carreau | 102—49 |
| 3,026,772 | 3/1962 | Moreland | 102—49 |
| 3,060,824 | 10/1962 | Brenner et al. | 95—12.5 |
| 3,124,072 | 3/1964 | Herrmann | 102—49 |
| 3,158,100 | 11/1964 | Finley | 102—49 |

BENJAMIN A. BORCHELT, *Primary Examiner.*

SAMUEL FEINBERG, *Examiner.*

V. R. PENDEGRASS, *Assistant Examiner.*